US007249565B2

(12) United States Patent
Schuster

(10) Patent No.: US 7,249,565 B2
(45) Date of Patent: Jul. 31, 2007

(54) MULTIPURPOSE AGRICULTURAL DEVICE

(76) Inventor: Joseph A. Schuster, 312 Nickleville Kahle Lake Rd., Emlenton, PA (US) 16376

( * ) Notice: Subject to any disclaimer, the term of this patent is extended or adjusted under 35 U.S.C. 154(b) by 341 days.

(21) Appl. No.: 10/994,749

(22) Filed: Nov. 22, 2004

(65) Prior Publication Data

US 2006/0123755 A1    Jun. 15, 2006

(51) Int. Cl.
*A01C 5/00* (2006.01)
*A01C 59/00* (2006.01)

(52) U.S. Cl. .......................................... 111/22; 111/59

(58) Field of Classification Search ................. 111/18, 111/22, 52, 59, 15
See application file for complete search history.

(56) References Cited

U.S. PATENT DOCUMENTS

| 2,935,957 | A |   | 5/1960  | Denton              |
|-----------|---|---|---------|---------------------|
| 4,116,137 | A | * | 9/1978  | Westerhoven ... 111/115 |
| 4,308,811 | A | * | 1/1982  | Bass ............... 111/112 |
| 4,355,588 | A |   | 10/1982 | Armstrong et al.    |
| 4,392,533 | A |   | 7/1983  | Bittle              |
| 5,207,277 | A |   | 5/1993  | Medlock             |
| 5,655,467 | A |   | 8/1997  | Yeshuda et al.      |
| 6,619,219 | B2|   | 9/2003  | Choi et al.         |
| 6,997,120 | B2| * | 2/2006  | Gabriel ............ 111/101 |

OTHER PUBLICATIONS

"2003 Equipment Catalog", catalog of Market Farm Implement, 58 pages.
Catalog of Delhi Foundry and Farm Machinery Ltd, dated Jan. 1, 2000, 46 pages.

* cited by examiner

*Primary Examiner*—Christopher J. Novosad
(74) *Attorney, Agent, or Firm*—Matis Baum Rizza O'Connor

(57) ABSTRACT

A multipurpose device for planting, transplanting and harvest garlic and similar crops in raised beds includes a base structure having a frame, gauge wheels attached to the frame to support it at a desired height from the raised bed, and left and right raised bed followers to engage the sides of a raised bed as the device is drawn along by a conventional agricultural tractor. Two chairs can be detachably mounted on the base structure, they are abreast of each other when planting or harvesting, or one behind the other when transplanting seedlings. The toolbar is mounted on the base structure in front of the chairs to provide room for attaching one or two furrow openers and a furrow closing plate can be detachably attached to the base structure behind the chairs when planting cloves or bulbs. A bed lifting plate can be detachably attached to the base structure in front of the chairs during harvesting operations to loosen the soil so that operators sitting in the chairs can pick the plants and place them on a conveyor detachably mounted between and to the rear of the chairs during harvesting.

5 Claims, 8 Drawing Sheets

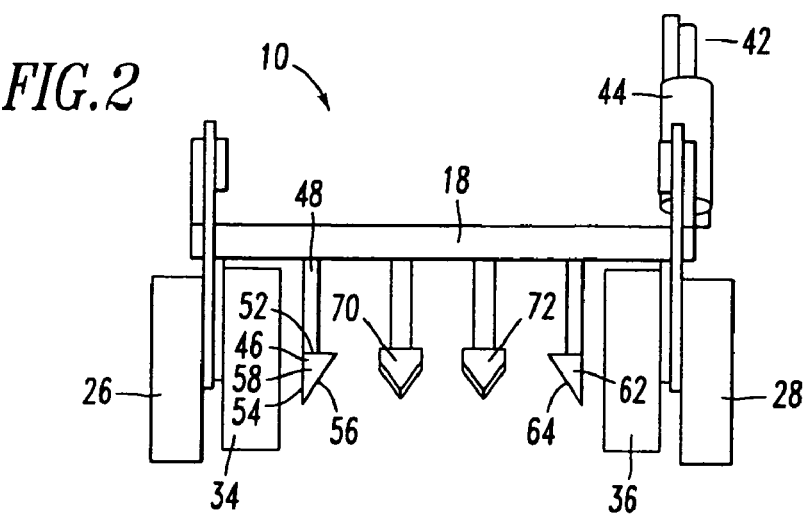
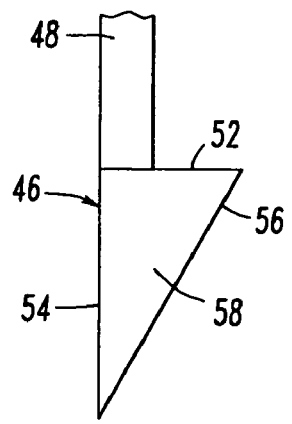
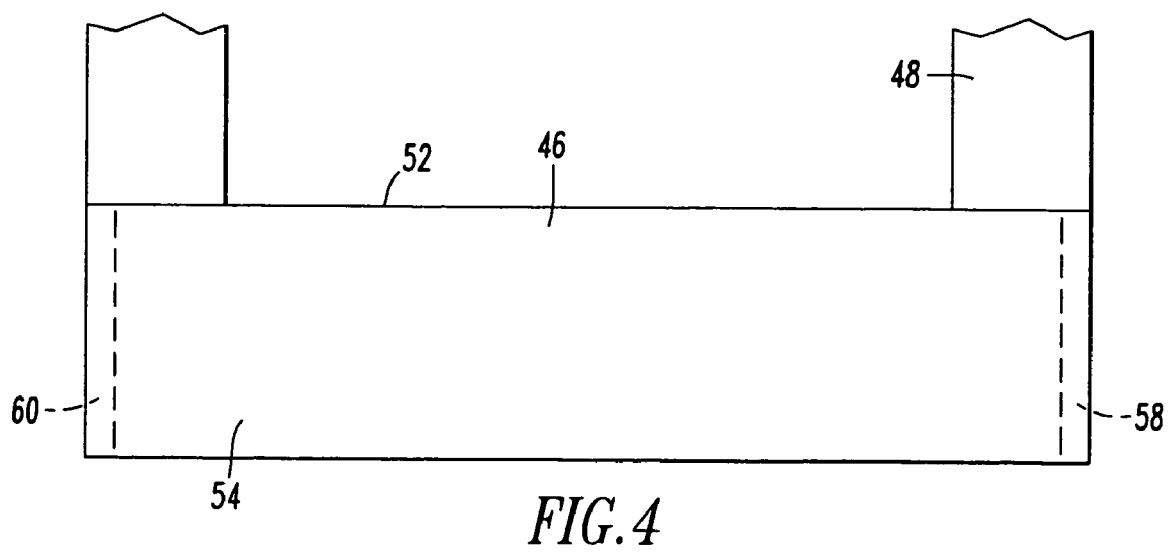

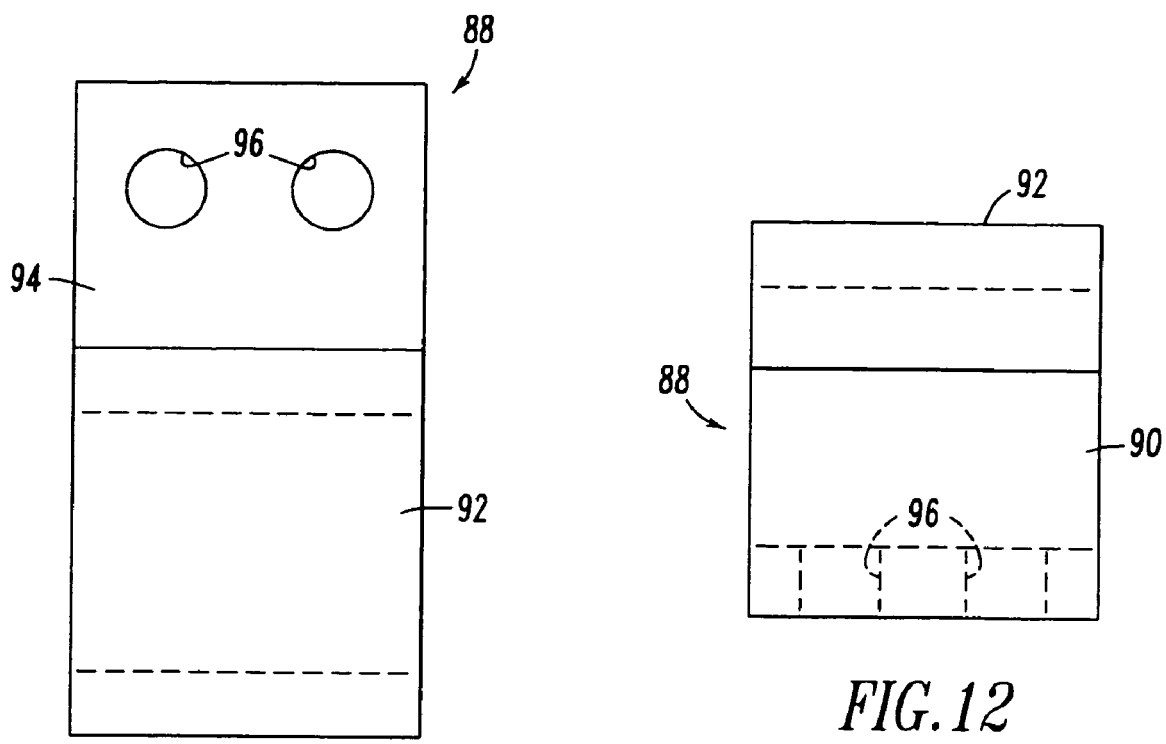
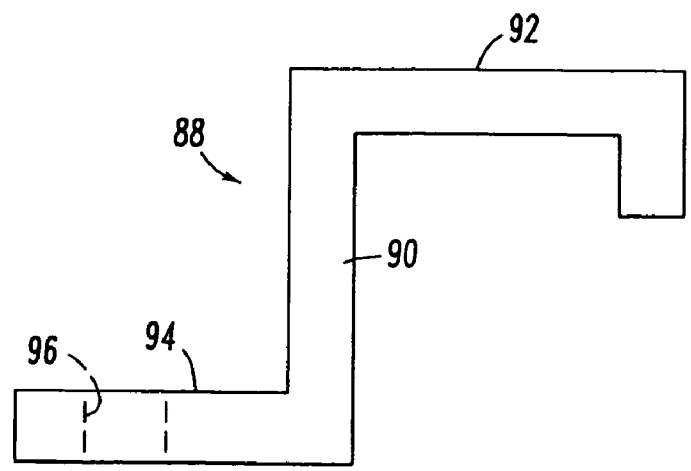
FIG.13

MULTIPURPOSE AGRICULTURAL DEVICE

BACKGROUND OF THE INVENTION

This invention relates to agricultural planting, transplanting and harvesting devices and, more particularly, to devices that can be reconfigured to perform any of those functions.

Garlic, onions, shallots and similar crops are commonly grown commercially in raised beds formed of parallel elongated mounds of earth extending across a farm field. One or two rows of plants are normally planted on each raised bed. When such crops are planted, it is necessary that each clove or bulb be planted with the root side down so that it will develop into a well formed, commercially desirable plant. A number of devices have been developed to mechanically plant cloves or bulbs in the proper orientation. Other devices have been developed to harvest garlic, onions, shallots and similar crops. Such devices tend to be fairly complex and expensive and are thus most economically employed on large farms.

SUMMARY OF THE INVENTION

The present invention provides a multipurpose device that can be economically employed on a small family farm to plant garlic, onions, shallots and similar crops in raised beds, either as cloves or bulbs or as transported seedlings, and also to harvest the matured plants. A base structure is provided which includes a frame, gauge wheels attached to the frame to support it at a desired height from a raised bed, and left and right raised bed followers designed to engage the sides of the raised bed as the multipurpose device is drawn along by a conventional agricultural tractor. The raised bed followers act to keep the multipurpose device aligned with the raised bed and also improve the shape of the raised bed.

Two chairs are provided which can be detachably mounted on the base structure either abreast of each other or one behind the other. A tool bar is mounted on the base structure in front of the chairs to provide means for attaching a furrow opener, or two furrow openers, as desired. When the chairs are mounted abreast, operators sitting in them can manually plant cloves or bulbs in the furrows opened by the furrow openers and thereby ensure that the cloves or bulbs are properly oriented. A furrow closing plate can be detachably attached to the base structure to the rear of the chairs during this operation to close the furrows without substantially disturbing the orientation of the cloves or bulbs.

For transplanting seedlings, the furrow closing plate is removed and the chairs are mounted on the base structure one behind the other. In this configuration, an operator sitting in the front chair can place seedlings in a furrow opened by the furrow opener in front of him and an operator sitting in second chair can manually close the furrow around the seedlings.

A deck is mounted on the base structure to the rear of the previously mentioned chairs. This deck provides a surface for storing supplies during operations. Also, if it is desired to lay irrigation tape as cloves or bulbs are planted or seedlings are transplanted, a reel can be detachably mounted on the rear of the deck so that the tape is paid out as the multipurpose device moves along a raised bed. For the laying of irrigation tape, a third chair is provided which can be detachably mounted behind the deck so that an operator sitting in it can clip the irrigation tape to the raised bed.

For harvesting, the two first mentioned chairs are placed abreast and a furrow lifting plate is detachably attached to the base structure between the furrow opener and those two chairs. As the multipurpose device is drawn along by an agricultural tractor during this operation, the furrow openers cut the roots of the plants to be harvested and loosen the soil around them. The raised bed lifting plate then lifts the plants and soil and further loosens the soil so that operators sitting in the chairs can pick the plants and place them on a conveyor which is detachably mounted between and to the rear of the chairs during harvesting. The conveyor is located so that can discharge harvested plants into a box located on the deck. A number of boxes can be placed on the deck so that a third operator can place an empty box under the conveyor as each preceding box is filled.

BRIEF DESCRIPTION OF THE DRAWINGS

FIG. 2 is a front elevation view of the base structure of FIG. 1

FIG. 3 is a front elevation view of a raised bed follower utilized with the base structure of FIG. 1

FIG. 4 is a side elevation view of the raised bed follower of FIG. 3.

FIG. 11 is a plan view of a mounting bracket utilized with the configuration of the device shown in FIG. 6.

FIG. 12 is a front elevation view of the mounting bracket of FIG. 11.

FIG. 13 is a side elevation view of the mounting bracket of FIG. 11.

DESCRIPTION OF THE PREFERRED EMBODIMENT

Figure 1:
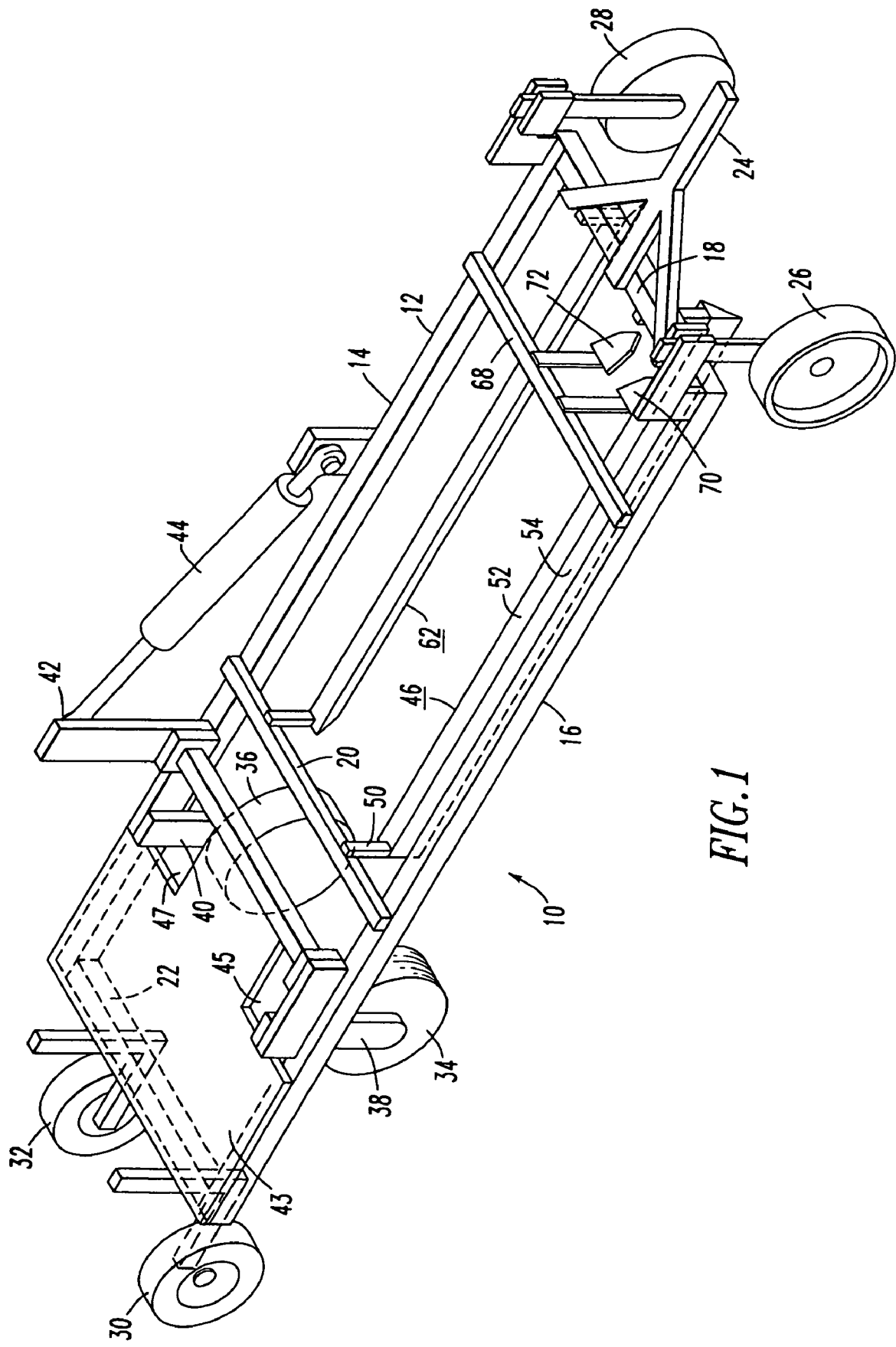
FIG. 1 is a perspective view of the base structure of a multipurpose agricultural device according to the present invention.

Referring to the drawings, FIGS. 1 and 2 show the base structure of a multipurpose agricultural device 10 having a frame 12 comprising a left frame member 14, a right frame member 16 a front transverse frame member 18, and intermediate transverse frame member 20 and a rear transverse frame member 22. A tongue 24 is attached the front transverse frame member 18 and provides means for attaching the multipurpose agricultural device 10 to the three point hitch of a conventional agricultural tractor, not shown. When engaged in planting, transplanting, or harvesting, the device is supported by front gauge wheels 26 and 28 and rear gauge wheels 30 and 32 to support the frame 12 at a desired height. For transporting the device 10 when not being so used, transport wheels 34 and 36 are provided. The transport wheels 34 and 36 are mounted on shafts 38 and 40 respectively, which are attached to each other and to pivot arm 42 so that the transport wheels 34 and 36 can be raised and lowered by operation of hydraulic cylinder 44. Hydraulic cylinder 44 is adapted for connection to the hydraulic system of conventional agricultural tractor by means of hoses, not shown. The shafts 38 and 40 are a sufficient length that, when the transport wheels 34 and 36 are lowered and the tongue 24 is raised sufficiently to cause the front gauge wheels 26 and 28 to clear the ground, the rear gauge wheels 30 and 32 will also clear the ground. A deck 43 is provided between the intermediate transverse frame member 20 and the rear transverse frame member 22 for the storage of supplies and/or procedure during operation. As is shown in FIG. 1, the deck 43 provides spaces 45 and 47 to accommodate transport wheels 34 and 36 respectively when those wheels are raised so as to not engage the ground.

A right raised bed follower 46 is attached to the front transverse frame member 18 by means of flange 48 and to intermediate transverse frame member 20 by means of flange 50. As may be seen in more detail in FIGS. 3 and 4, the right raised bed follower 46 has a triangular cross section, with an upper surface 52, an outer side surface 54 and an inner surface 56. The ends of the right raised bed follower 46 are closed by front end plate 58 and rear end plate 60. Referring back to FIGS. 1 and 2, a left raised bed follower 62 is similarly attached to the front transverse frame member 18 and the intermediate transverse frame member 20. The left raised bed follower 62 is disposed substantially parallel to right raised bed follower 54 and has an inner surface 64. The bed followers 46 and 62 are spaced apart such that their respective inner surfaces, 56 and 64, will engage opposite sides of a raised bed. In operation, the engagement of the inner sides 56 and 64 with the sides of a raised bed keep the multipurpose agricultural device 10 aligned with the raised bed and also improve the shape of the raised bed.

A tool bar 68 is disposed between the left frame member 14 and the right frame member 16. A first furrow opener 70 of a conventional design may be detachably attached to the tool bar 68 at any desired location there on. A second furrow opener 72 may also be attached to the tool bar 68.

Figure 5:
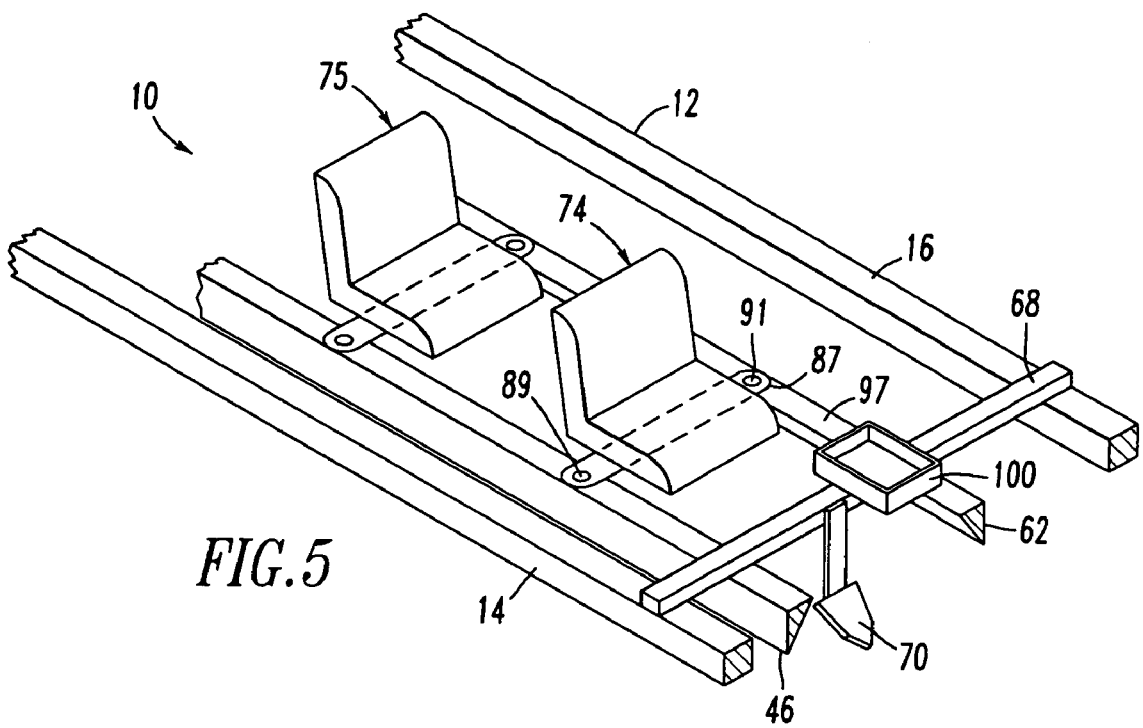
FIG. 5 is a perspective view of a portion of the base structure of FIG. 1 with chairs attached in a configuration to facilitate planting or transplanting of crops.
Figure 6:
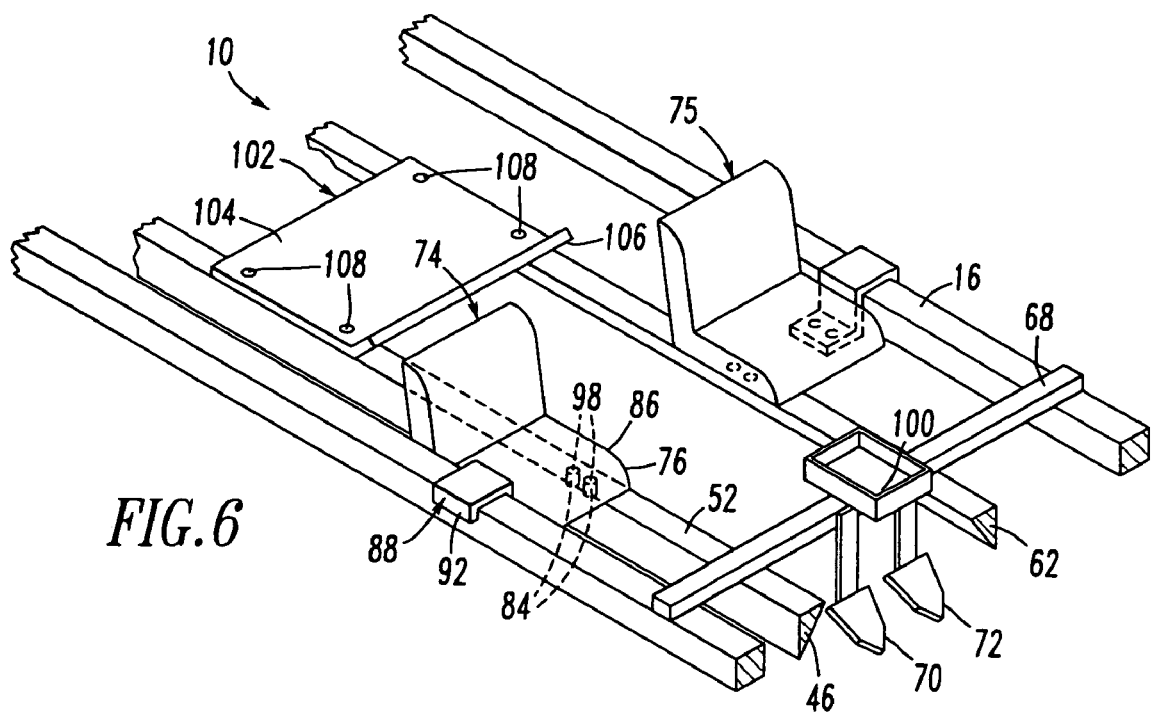
FIG. 6 is a perspective view of a portion of the base structure of FIG. 1 with chairs attached in a configuration to facilitate harvesting of crops.
Figure 7:
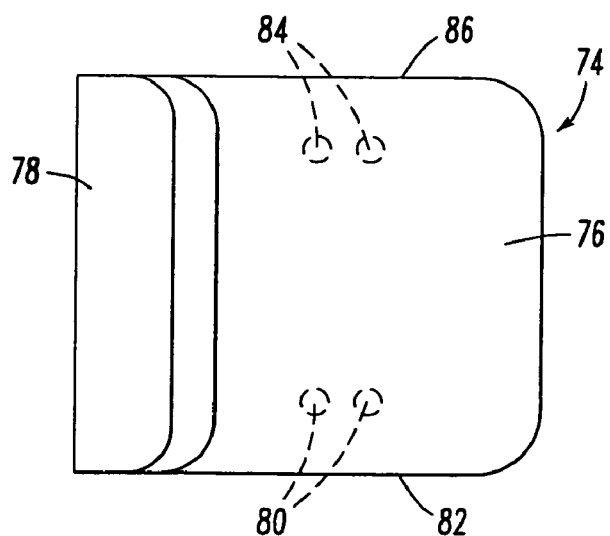
FIG. 7 is a plan view of a chair of FIGS. 5 and 6.
Figure 8:
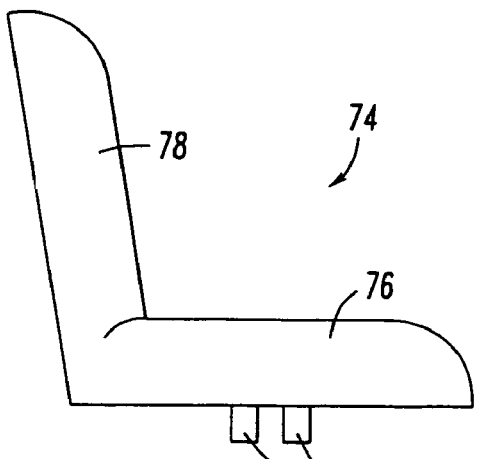
FIG. 8 is a side elevation view of the chair of FIG. 7.
Figure 9:
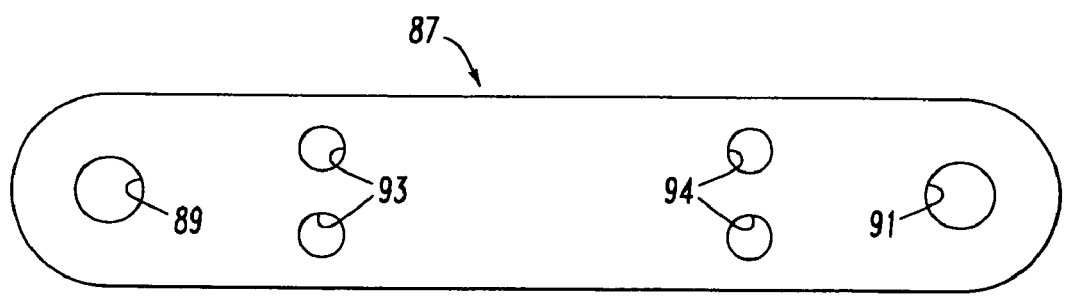
FIG. 9 is a plan view of a mounting bracket utilized with the configuration of the device shown in FIG. 5.
Figure 10:
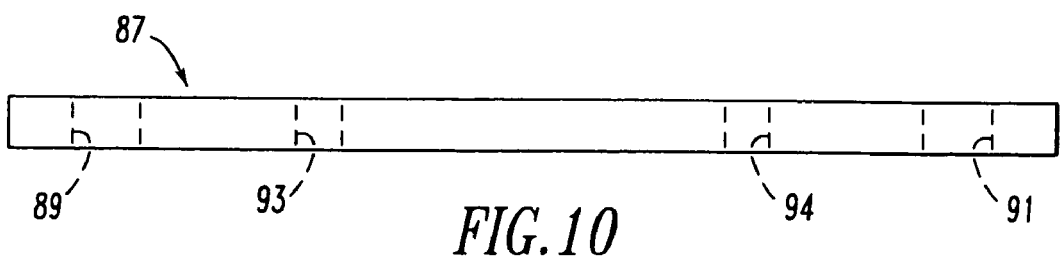
FIG. 10 is a side elevation view of the mounting bracket of FIG. 9.

A first chair 74 and a second chair 75 may be detachably attached to the multipurpose agricultural device 10 either in the positions shown in FIG. 5 or in the positions shown in FIG. 6. The utility of this option will be explained below after describing how it is accomplished. First chair 74 is shown in greater detail in FIGS. 7 and 8 and the construction of second chair 75 is identical. First chair 74 includes a seat 76, a back 78, a pair of bolts 80 projecting downward from the seat 76 adjacent to the right edge 82 thereof, and a pair of bolts 84 projecting downward from the seat 76 adjacent to the left edge 86 of the chair. To detachably attach the first chair 74 to the multipurpose agricultural device 10 in the manner shown in FIG. 5, a mounting bracket 87 like that shown in more detail in FIGS. 9 and 10 is provided. The mounting bracket 87 includes a first bolt hole 89 and a second bolt 91 which are spaced apart so that bolt holes provided in raised follower 46 and raised follower 62 can be utilized to bolt the bracket 87 between the two raised be followers in the manner shown in FIG. 5. As further shown in FIGS. 9 and 10, the bracket 87 also includes a first pair of holes 93 which are spaced apart to accept the pair of bolts 80 adjacent to the right edge 82 of chair 74, and a second pair of holes 95 which are spaced apart to accept the pair of bolts 84 adjacent to the left edge 86 of chair 74. The detachable attachment of the second chair 75 behind the first chair 74 as shown in FIG. 5. is accomplished in a manner identical to that used for first chair 74. It will be understood that the provision of a multiplicity of holes in the upper surface 52 of the right raised bed follower 46 and in the upper surface 97 of left raised bed follower 62 would allow the chairs 74 and 75 to be positioned farther forward or farther back to accommodate the comfort of their occupants.

In order to mount first chair 74 in the manner shown FIG. 6, a mounting bracket 88 like that shown in FIGS. 11, 12, and 13 is provided. Each mounting bracket 88 includes a vertical portion 90, a hook portion 92 and a horizontal portion 94. A pair of bolt holes 96 are located in the horizontal portion 94 and spaced apart so as to accept the pair of bolts 80 adjacent to the right edge 82 of the chair 74 shown FIGS. 7 and 8. To detachably attach the first chair 74 to the multipurpose agricultural device 10 in the manner shown in FIG. 6, the mounting bracket 88 is attached to the right pair of bolts 80. The first chair 74 is then detachably attached to the multipurpose agricultural device 10 by placing the pair of bolts 84 adjacent to the left edge 86 in a pair of holes provided in the upper surface 52 of the right raised bed follower 46 and hooking the hook 92 of bracket 88 over the right frame member 14. It will be understood that the provision of a multiplicity of holes in the upper surface 52 of the right raised bed follower 46 would allow the chair 74 to be positioned farther forward, or farther back, to accommodate the comfort of the occupant. The attachment of the second chair 75 abreast of the first chair 74 as shown in FIG. 6 is accomplished in a manner that is a mirror image of that used for first chair 74.

Returning to FIG. 5, this shows the configuration that is adapted to transplanting seedlings of garlic and similar crops. In this configuration, a single furrow opener 70 is centered on the tool bar 68 and a tray 100 is detachably attached to the tool bar to hold boxes of seedlings within easy reach of a first operator occupying first chair 74. In operation, as the multipurpose agricultural device 10 is drawn along a raised bed by a conventional agricultural tractor, the first operator in first chair 74 removes seedlings from the tray 100 and places them in the furrow cut by furrow opener 70. A second operator, sitting in second chair 75, then manually closes the furrow around the roots of the seedlings as they come into reach.

Figure 14:
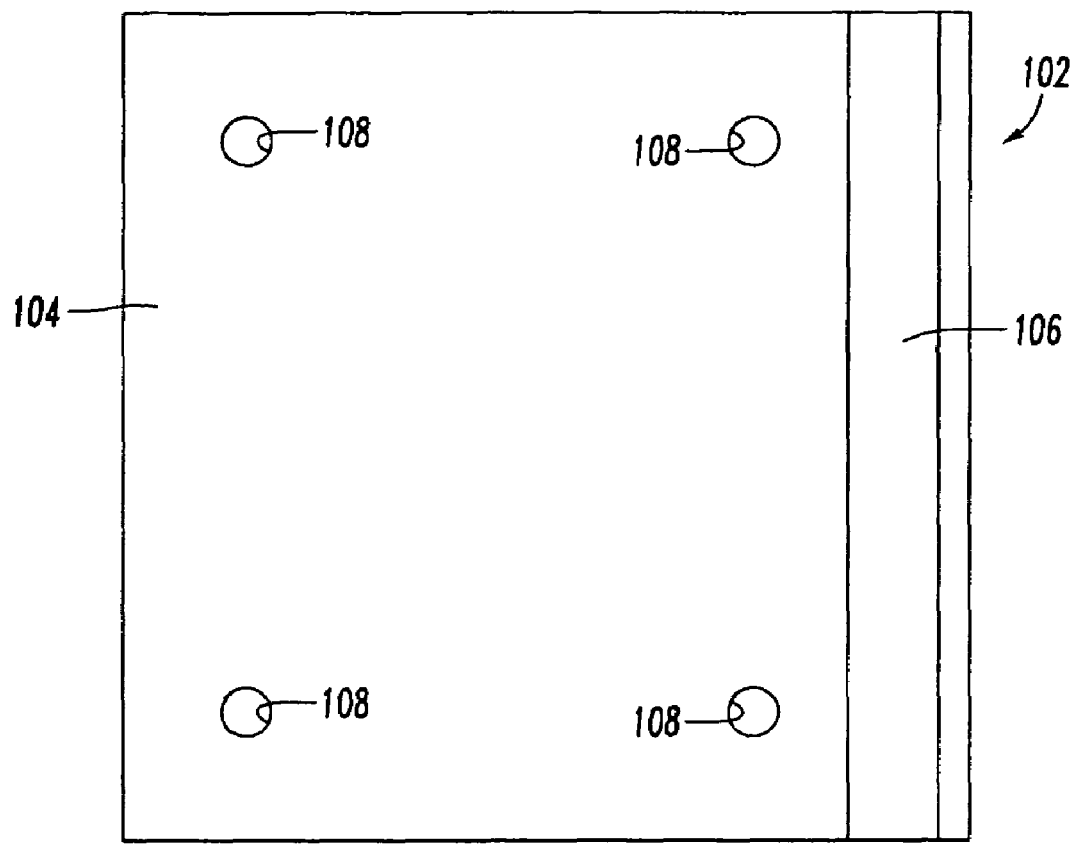
FIG. 14 is a plan view of a furrow closing plate utilized with the base structure of FIG. 1.
Figure 15:
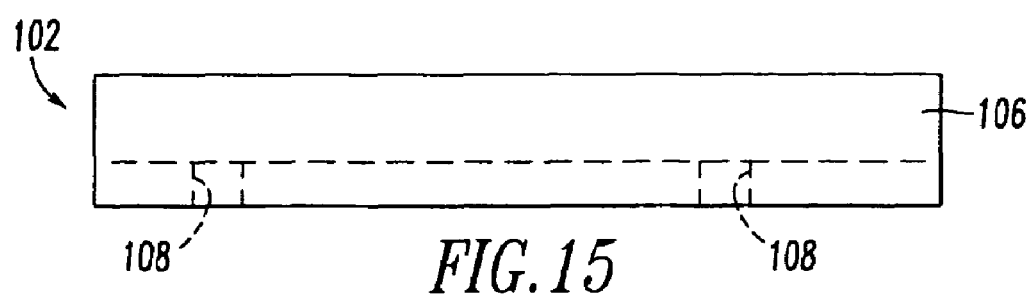
FIG. 15 is a front elevation view of the furrow closing plate of FIG. 14.
Figure 16:
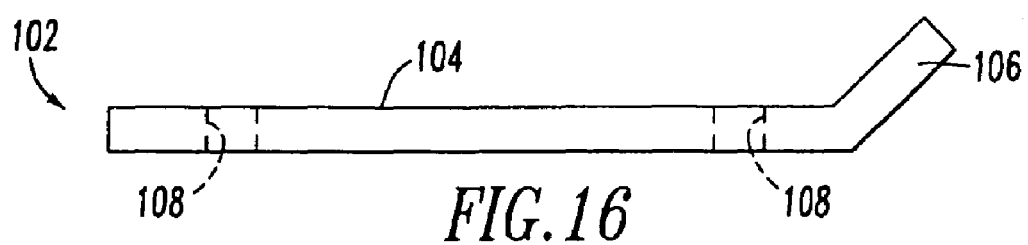
FIG. 16 is a side elevation view of the furrow closing plate of FIG. 14.

FIG. 6 illustrates the configuration that is adapted to planting garlic cloves, onion bulbs and the like. In this configuration, a first operator, sitting in first chair 74, and a second operator, sitting in second chair 75, sit abreast. A first furrow opener 70 is attached to the tool bar 68 in such a position that it will cut a furrow within the convenient reach of the first operator and a second furrow opener 72 is attached to the tool bar 68 so that it will cut a furrow within the convenient reach of the second operator. The tray 100 is also detachably attached to the tool bar 68 to hold the cloves or bulbs to be planted within the convenient reach of both the first operator and the second operator. As the multipurpose agricultural device 10 is drawn along a raised bed by a conventional agricultural tractor, each operator takes cloves or bulbs from the tray 100 and places them, root end down, in the furrow cut by the furrow opener closest to him or her. The furrows cut by both first furrow opener 70 and second furrow opener 72 are then both closed by a furrow closing plate 102. As is shown in more detail in FIGS. 14, 15 and 16, closing plate 102 is comprised of a plate having a horizontal segment 104 and an upwardly angled front segment 106. Bolt holes 108 are provided so that the closing plate 102 can be bolted atop the raised bed followers 46 and 62 in the manner shown in FIG. 6. The front segment 106 of furrow closing plate 102 is angled upward from the horizontal segment 104 by approximately 55 degrees. In operation, the furrow closing plate 102 will press against the top of a raised bed and close the furrows in which cloves or bulbs have been placed without substantially disturbing the orientation of those cloves or bulbs. It will be understood that the furrow closing plate 102 could not be in place when transplanting seedlings, since it would damage the seedlings. It is also undesirable to have the closing plate 102 in place when using the multipurpose agricultural device 10 for harvesting because the furrow closing plate 102 would then only create unnecessary resistance to the movement of the device.

Figure 17:
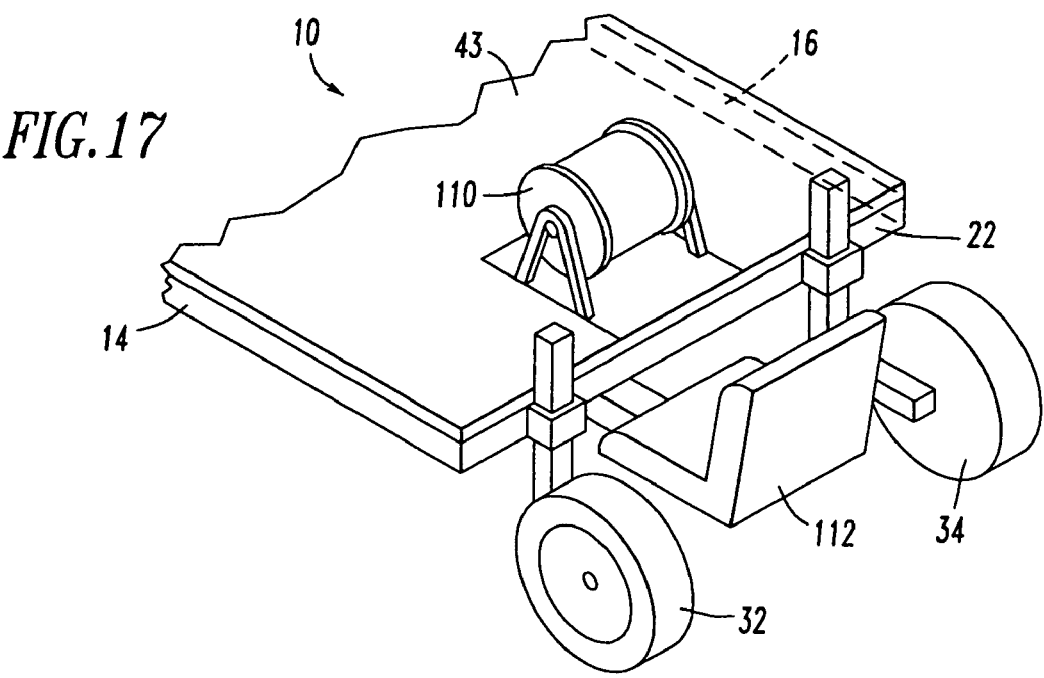
FIG. 17 is a perspective view of the rear of an agricultural device according to the present invention with attachments for the laying of irrigation tape.

When either transplanting seedlings or planting cloves or bulbs, it may be considered desirable to lay irrigation tape along the plantings. FIG. 17 shows the rear of a multipurpose agricultural device 10 with attachments adapted to this purpose. A reel 110 to hold irrigation tape which can be paid out as the multipurpose agricultural device 10 is drawn forward is mounted on the deck 43 and a forward facing chair 112 is detachably attached to the device 10 to the rear of the rear frame member 22. The chair 112 is positioned to the rear and side of the reel 112 such that an operator sitting in that chair can secure the irrigation tape to the ground using conventional irrigation tape clips.

Figure 18:
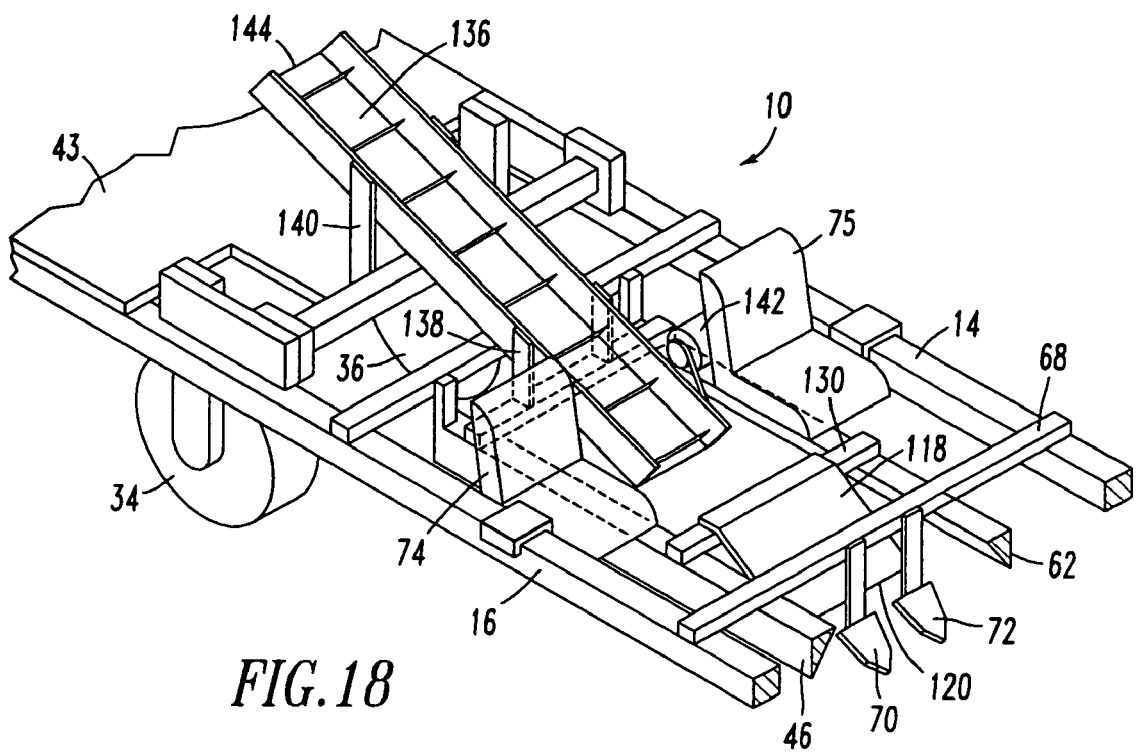
FIG. 18 is a perspective view of the configuration of the device shown in FIG. 6 showing the attachment of a bed lifting plate and conveyor utilized therewith.
Figure 19:
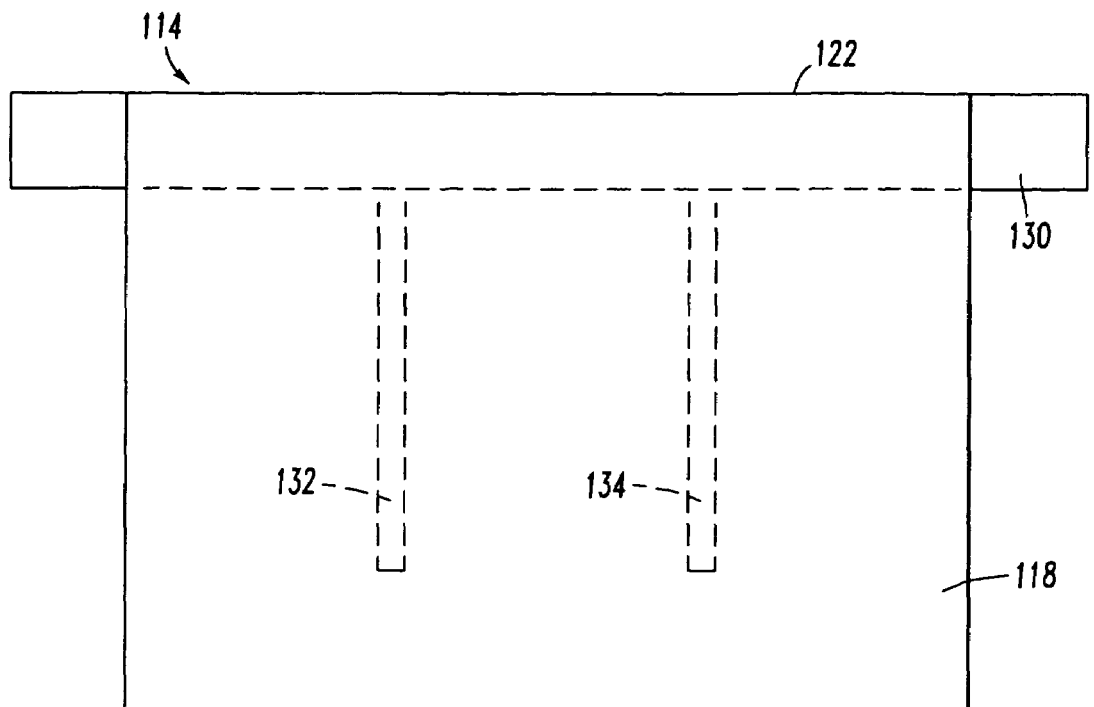
FIG. 19 is a plan view of the lifting plate of FIG. 18.
Figure 20:
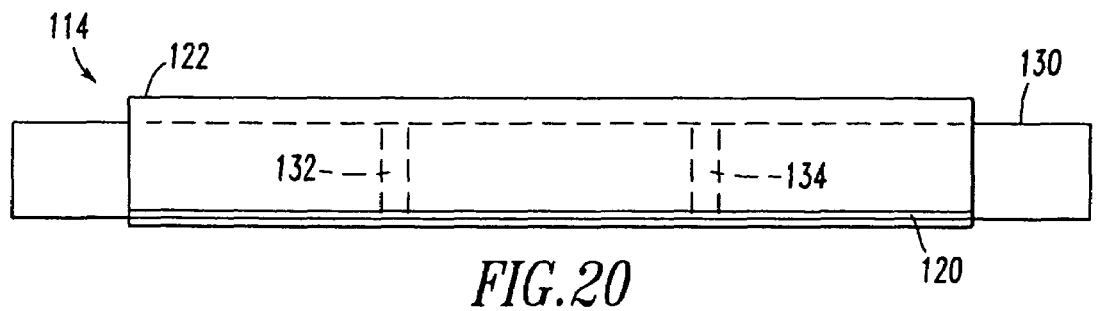
FIG. 20 is a front elevation view of the lifting plate of FIG. 19.
Figure 21:
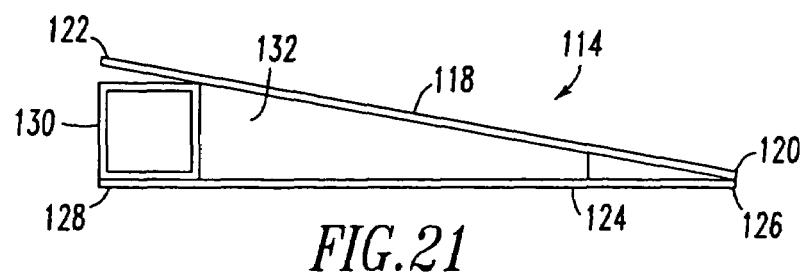
FIG. 21 is a side elevation view of the lifting plate of FIG. 19.

FIG. 18 shows the relevant parts of the multipurpose agricultural device 10 configured for harvesting garlic, onions and the like. In this configuration, the first chair 74 and the second chair 75 are positioned abreast of each other, similar to their configuration for planting cloves or bulbs. If two rows of plants have been planted in the raised bed to be harvested, a first furrow opener 70 and a second furrow opener 72 are mounted on the tool bar 68 to provide initial loosening of the soil and to cut the roots of the plants to be harvested. A bed lifting plate 114 is attached to a second tool bar 116 which is bolted between right raised bed follower 46 and left raised bed follower 62. As is shown in FIGS. 19, 20 and 21, the bed lifting plate 114 is comprised of an upper plate 118 having a front edge 120 and a rear edge 122, a lower plate 124 having a front edge 126 and a rear edge 128, and a box beam 130. The front edge 120 of upper plate 118 and the front edge 126 of lower plate 114 are welded together and the box beam 130 is welded between upper plate 118 and lower plate 114 adjacent to their rear edges 122 and 128. Stiffening plates 132 and 134 are also welded between 118 and lower plate 114 as shown. The box beam 130 is longer than the width of the plates 118 and 124 so as to provide points of attachment to the second tool bar 116 as shown in FIG. 18. As also shown in FIG. 18, for harvesting operations a conveyer 136 is detachably detached to the multipurpose agricultural device 10 by means of a front support 138 detachably attached to the furrow followers 46 and 62 and a rear support 140 detachably attached to the deck 43. The conveyer is driven by a hydraulic motor 42 which can be energized through hoses, not shown, which are attachable to the hydraulic system of a conventional agricultural tractor. In harvesting operations, as the multipurpose agricultural device 10 is drawn along a raised bed by a conventional agricultural tractor, the furrow openers 70 and 72 cut the roots of the plants to be harvested and also loosen the soil around them. The raised bed lifting plate 114 then lifts the plants and the soil surrounding the plants. The surrounding soil is further loosened by this lifting and operators sitting in chairs 74 and 75 can then pick up the plants to be harvested and place them on the conveyer 136. The plants are then raised by the conveyor 136 until they are discharged at its top 144. From there, the plants can fall into a box, not shown, placed on the deck 43 by a third operator positioned on that deck. A number of boxes can be placed on the deck 43 so that the third operator can place an empty box under the top 144 of conveyor 136 as each preceding box is filled. Such boxing of the plants immediately after they are harvested prevents the damage that can be caused by sunlight and the elements if newly harvested plants are allowed to lie on the ground.

I have found it desirable to make the lifting plate 114 approximately 61 cm (24 inches) wide and between 40.6 cm (16 inches) and 45.7 cm (18 inches) from front to rear with the angle between the upper plate 118 and the lower plate 124 being approximately 20 degrees. I have also found it desirable to make all the components of the lifting plate 114 of steel approximately 0.64 cm (0.25 inches) in thickness and to use the same material in the construction of the raised bed followers 46 and 62 and the furrow closing plate 102. I have found that the lifting plate 118 will operate satisfactorily when inclined downward from the horizontal between 15 degrees and 50 degrees, but that it is preferable to have it incline down from the horizontal between 20 degrees and 48 degrees.

Many changes and modifications in the above described embodiment of my invention can, of course, be carried out without departing from the scope thereof.

I claim:

1. An agricultural device for use in an agricultural field having a raised bed having a right side and a left side, said device comprising;
    (a) a base structure comprising,
        (i) a frame,
        (ii) a multiplicity of gauge wheels attached to said frame and capable of supporting said frame at a desired height above a raised bed,
        (iii) a right raised bed follower attached to said frame and capable of engaging the right side of a raised bed, and
        (iv) a left raised bed follower attached to said frame and capable of engaging the left side of a raised bed,
    (b) a plurality of chairs, each of which is detachably attachable to said base structure at a plurality of positions such that, in a first configuration said chairs are abreast of each other and in a second configuration said chairs are in file with respect to the direction of travel of the device, and such that in each of said plurality of positions, the raised bed will be within the reach of an operator sitting in any of said plurality of chairs.

2. The agricultural device according to claim 1 further comprising a furrow closing plate detachably attachable to said base structure between the right raised bed follower and the left raised bed follower.

3. The agricultural device according to claim 2 wherein said furrow closing plate comprises a horizontal segment and an upwardly angled front segment.

4. The agricultural device according to claim 1 further comprising a raised bed lifting plate detachably attachable to said base structure between said right raised bed follower and the left raised bed follower.

5. The agricultural device according to claim 4 further comprising a conveyor capable of lifting harvested plants.

* * * * *